US012700661B2

(12) United States Patent
Xia et al.

(10) Patent No.: US 12,700,661 B2
(45) Date of Patent: Aug. 4, 2026

(54) ANTENNA APPARATUS AND MOBILE TERMINAL

(71) Applicants: HUAWEI TECHNOLOGIES CO., LTD., Shenzhen (CN); Research Institute of Millimeter Wave and Terahertz Technology, Nanjing (CN)

(72) Inventors: Xiaoyue Xia, Nanjing (CN); Wei Hong, Nanjing (CN); Fan Wu, Nanjing (CN); Chao Yu, Nanjing (CN); Zhihao Jiang, Nanjing (CN); Yu Yao, Shanghai (CN)

(73) Assignees: Huawei Technologies Co., Ltd., Shenzhen (CN); Research Institute of Millimeter Wave and Terahertz Technology, Nanjing (CN)

(*) Notice: Subject to any disclaimer, the term of this patent is extended or adjusted under 35 U.S.C. 154(b) by 0 days.

(21) Appl. No.: 18/977,907

(22) Filed: Dec. 11, 2024

(65) Prior Publication Data

US 2025/0112359 A1 Apr. 3, 2025

Related U.S. Application Data

(63) Continuation of application No. PCT/CN2023/098505, filed on Jun. 6, 2023.

(30) Foreign Application Priority Data

Jun. 13, 2022 (CN) ......................... 202221475669.2

(51) Int. Cl.
*H01Q 1/24* (2006.01)
*H01Q 1/36* (2006.01)
(Continued)

(52) U.S. Cl.
CPC ............... *H01Q 1/243* (2013.01); *H01Q 1/36* (2013.01); *H01Q 1/48* (2013.01); *H01Q 9/0407* (2013.01);
(Continued)

(58) Field of Classification Search
CPC ........... H01Q 1/243; H01Q 1/36; H01Q 1/48; H01Q 9/0407; H01Q 9/0414; H01Q 13/10; H01Q 13/18; H01Q 21/064; H01Q 21/065
See application file for complete search history.

(56) References Cited

U.S. PATENT DOCUMENTS

| | | | | |
|---|---|---|---|---|
| 11,196,184 B2 * | 12/2021 | Jordan | ............... | H01Q 21/0093 |
| 11,296,409 B1 * | 4/2022 | Yousefi | ................ | H01Q 9/0407 |

(Continued)

FOREIGN PATENT DOCUMENTS

| | | |
|---|---|---|
| CN | 108987905 A | 12/2018 |
| CN | 108987944 A | 12/2018 |

(Continued)

OTHER PUBLICATIONS

Moreno et al. "Dual-Polarized mm-Wave Endfire Chain-Slot Antenna for Mobile Devices", IEEE Transactions on Antennas and Propagation, vol. 69, No. 1, Jun. 16, 2020 (Year: 2020).*

(Continued)

*Primary Examiner* — Ab Salam Alkassim, Jr.
(74) *Attorney, Agent, or Firm* — Leydig, Voit & Mayer, Ltd.

(57) ABSTRACT

An antenna apparatus includes a first radiating patch with slots and a plurality of feed modules in correspondence with the slots. Each feed module includes a ground component and a feed component. The ground component includes a first conductor patch, a second conductor patch, and a conductor column. The feed component includes a second
(Continued)

radiating patch and a first feed member, the second radiating patch and the second conductor patch are spaced from each other. When the foregoing structure is used, integration of an antenna radio frequency system can be improved.

20 Claims, 6 Drawing Sheets

(51) Int. Cl.
*H01Q 1/48* (2006.01)
*H01Q 9/04* (2006.01)
*H01Q 13/10* (2006.01)
*H01Q 13/18* (2006.01)
*H01Q 21/06* (2006.01)

(52) U.S. Cl.
CPC ........... *H01Q 9/0414* (2013.01); *H01Q 13/10* (2013.01); *H01Q 13/18* (2013.01); *H01Q 21/064* (2013.01); *H01Q 21/065* (2013.01)

(56) References Cited

U.S. PATENT DOCUMENTS

| | | | | |
|---|---|---|---|---|
| 12,519,237 | B2 * | 1/2026 | Renard | H01Q 9/0414 |
| 2003/0193438 | A1 * | 10/2003 | Yoon | H01Q 1/243<br>343/702 |
| 2011/0025574 | A1 * | 2/2011 | Tiezzi | H01Q 9/0457<br>343/824 |
| 2015/0207235 | A1 * | 7/2015 | Lee | H01Q 21/24<br>343/767 |
| 2018/0191073 | A1 * | 7/2018 | Celik | H01Q 5/40 |
| 2019/0027808 | A1 * | 1/2019 | Mow | H04R 5/04 |
| 2020/0076082 | A1 * | 3/2020 | Nasimuddin | H01Q 9/0421 |
| 2020/0091619 | A1 * | 3/2020 | Takaki | H01Q 5/378 |
| 2021/0005968 | A1 * | 1/2021 | Park | H01Q 21/08 |
| 2021/0320408 | A1 * | 10/2021 | Huang | H01Q 5/378 |
| 2022/0006198 | A1 * | 1/2022 | Edwards | H01Q 1/38 |
| 2022/0029298 | A1 * | 1/2022 | Huang | H01Q 5/35 |
| 2023/0052927 | A1 * | 2/2023 | Kim | H01Q 1/243 |
| 2023/0101577 | A1 * | 3/2023 | Yong | H01Q 19/06<br>343/860 |
| 2024/0145928 | A1 * | 5/2024 | Crawford | H01Q 13/0275 |
| 2024/0275052 | A1 * | 8/2024 | Wang | H01Q 1/48 |
| 2024/0304999 | A1 * | 9/2024 | Zhu | H01Q 1/243 |
| 2024/0305004 | A1 * | 9/2024 | Varheenmaa | H01Q 21/30 |
| 2024/0313388 | A1 * | 9/2024 | Yao | H01Q 1/2283 |
| 2025/0046988 | A1 * | 2/2025 | Zhu | H01Q 1/243 |
| 2026/0011923 | A1 * | 1/2026 | Zhu | H01Q 1/38 |
| 2026/0031540 | A1 * | 1/2026 | Li | H01Q 9/0414 |

FOREIGN PATENT DOCUMENTS

| | | | | | |
|---|---|---|---|---|---|
| CN | 108987945 A | | 12/2018 | |
| CN | 109346829 A | | 2/2019 | |
| CN | 109793134 A | | 5/2019 | |
| CN | 109149074 B | | 7/2020 | |
| CN | 112448137 A | | 3/2021 | |
| CN | 113013610 A | | 6/2021 | |
| CN | 111509403 B | * | 2/2022 | H01Q 5/50 |
| CN | 218182468 U | | 12/2022 | |
| CN | 119965542 A | * | 5/2025 | |
| EP | 3726648 B1 | * | 6/2023 | H01Q 9/0464 |
| WO | WO-2024027426 A1 | * | 2/2024 | H01Q 19/10 |

OTHER PUBLICATIONS

ISO/IEC/IEEE 8802-11, First edition 2012, Information technology—Telecommunications and information exchange between systems—Local and metropolitan area networks—specific requirements—Part 11: Wireless LAN medium access control (MAC) and physical layer (PHY) specifications, Amendment 3: Enhancements for very high throughput in the 60 GHz band (adoption of IEEE Std 802.11ad-2012), Total 634 pages (Mar. 2014).

"IEEE P802.11aj™/D2.0, Draft Standard for Information technology—Telecommunications and information exchange between systems—Local and metropolitan area networks—specific requirements, Part 11: Wireless LAN medium access control (MAC) and physical layer (PHY) specifications, Amendment 5: Enhancements for Very High Throughput to Support Chinese Millimeter Wave Frequency Bands (60 GHZ and 45 GHZ)," Total 312 pages. (May 2016).

Kurvinen et al., "Co-Designed mm-Wave and LTE Handset Antennas," IEEE Transactions on Antennas and Propagation, vol. 67, No. 3, total 9 pages (Mar. 2019).

Moreno et al., "Dual-Polarized mm-Wave End-Fire Antenna for Mobile Devices," IEEE Transactions on Antennas and Propagation, vol. 68, No. 8, Total 12 pages (Aug. 2020).

* cited by examiner

ANTENNA APPARATUS AND MOBILE TERMINAL

CROSS-REFERENCE TO RELATED APPLICATIONS

This application is a continuation of International Application No. PCT/CN2023/098505, filed on Jun. 6, 2023, which claims priority to Chinese Patent Application No. 202221475669.2, filed on Jun. 13, 2022. The disclosures of the aforementioned applications are hereby incorporated by reference in their entireties.

TECHNICAL FIELD

Embodiment of this application relate to the field of antenna technologies, and in particular, to an antenna apparatus and a mobile terminal.

BACKGROUND

A millimeter-wave (MMW) technology is one of core technologies of a 5th generation mobile communication technology (5G). Mobile terminals such as mobile phones are integrated with millimeter-wave antenna radio frequency systems more commonly. As a popular appearance design in the mobile phone, a metal side frame severely blocks an internal millimeter-wave antenna. In a conventional technology, in some technical means, a slit is provided on the metal side frame, so that the metal side frame is used as a slot antenna to externally radiate. However, in such technical means, a reflection panel needs to be separately disposed to implement unidirectional transmission, and integration of the entire system is relatively low.

SUMMARY

Embodiments of this application provide an antenna apparatus and a mobile terminal, to improve integration of an antenna radio frequency system.

According to a first aspect, this application provides an antenna apparatus. The antenna apparatus may include a first radiating patch and a feed module. The first radiating patch and the feed module may be spaced from each other in a first direction, and the first direction is perpendicular to an extension direction of the first radiating patch. A plurality of slot structures arranged in a second direction may be provided on the first radiating patch, and the second direction is the extension direction of the first radiating patch. There may be a plurality of feed modules, and the plurality of feed modules may be in one-to-one correspondence with the plurality of slot structures in the second direction. The feed module may include a ground component and a feed component. The ground component may include a first conductor patch, a second conductor patch, and a conductor column, the first conductor patch and the second conductor patch may be spaced from each other in the first direction, the first conductor patch may be located between the second conductor patch and the first radiating patch, two ends of the conductor column may be connected to the first conductor patch and the second conductor patch respectively, the first conductor patch may have a first through hole, and the second conductor patch may have a second through hole. The feed component may include a second radiating patch and a first feed member, the second radiating patch and the second conductor patch may be spaced from each other in the first direction, a projection of the second radiating patch on the first conductor patch may be located in the first through hole, and the first feed member may pass through the second through hole and may be connected to the second radiating patch.

In the technical solutions provided in this application, the slot structure is provided on the first radiating patch, and the first radiating patch and the feed module that are spaced from each other may form a slot antenna. The slot antenna may be used as a millimeter-wave antenna, and the feed module may be coupled to and feed the slot structure. The ground component may be used as a ground of the slot antenna, and the ground component can have a reflection function, to implement unidirectional transmission of a radio frequency signal. Compared with the conventional technology, the ground component is integrated into the feed module. Therefore, there is no need to separately dispose an additional reflection panel. This can improve integration of an antenna radio frequency system.

In a specific implementation solution, a first end of the first radiating patch in the second direction may be connected to a ground member and a second feed member separately, and the ground member and the second feed member may be spaced from each other. In this way, the first radiating patch, the ground member, and the second feed member can form an inverted F-shaped antenna. The first radiating patch can be used as a radiator of a low-frequency antenna, the first radiating patch can have a low-frequency radiation function, and the antenna apparatus can have both a millimeter-wave radiation function and a low-frequency radiation function.

In a specific implementation solution, the slot structure may be in a cross shape. In this way, the slot structure can generate a resonance under excitation of the feed module.

In a specific implementation solution, a protrusion structure may be provided on the first radiating patch. In this way, millimeter-wave antennas with different matching can be obtained by disposing protrusion structures of different heights.

In a specific implementation solution, there may be a plurality of conductor columns, and the plurality of conductor columns may be arranged in a circumferential direction of the first conductor patch. In this way, relative positions of the first conductor patch and the second conductor patch are relatively stable.

In a specific implementation solution, the second radiating patch may have a third through hole. In this way, the second radiating patch can effectively excite the slot structure to generate a resonance.

In a specific implementation solution, there may be a plurality of first feed members, and the plurality of first feed members may be arranged in a circumferential direction of the second radiating patch. In this way, the feed module can perform feeding in a differential manner, and the millimeter-wave antenna can provide two resonances.

In a specific implementation solution, there may be a plurality of second through holes, and the plurality of second through holes may be in one-to-one correspondence with the plurality of first feed members. In this way, it is convenient to dispose the first feed member.

In a specific implementation solution, the second radiating patch and the first conductor patch may be located in a same plane in the first direction. In this way, it is convenient to dispose the second radiating patch and the first conductor patch.

In a specific implementation solution, a support member may be disposed between the first radiating patch and the feed module, and two ends of the support member may be connected to the first radiating patch and the first conductor patch respectively. In this way, relative positions of the first radiating patch and the feed module can be relatively stable.

In a specific implementation solution, there may be a plurality of support members, and at least one support member may be disposed between adjacent feed modules. In this way, stability of the relative positions of the first radiating patch and the feed module can be improved.

According to a second aspect, this application provides a mobile terminal. The mobile terminal may include a housing and the antenna apparatus according to any one of the implementation solutions of the first aspect. The housing may have an opening, a first radiating patch may be disposed in the opening, and there may be a gap between the first radiating patch and the housing. A feed module may be disposed in the housing. System integration of the antenna apparatus is relatively high. This facilitates miniaturization of the mobile terminal.

In a specific implementation solution, a first end of the first radiating patch in a second direction may be connected to the housing. In this way, the first radiating patch can be used as a radiator of a low-frequency antenna, and the antenna apparatus can have both a millimeter-wave radiation function and a low-frequency radiation function, so that a signal sending and receiving capability of the mobile terminal can be improved.

REFERENCE NUMERALS

100: first radiating patch; 200: feed module; 300: support member; 400: housing; 101: slot structure; 102: protrusion structure;

103: ground member; 104: second feed member; 201: first conductor patch; 202: second conductor patch; 203: conductor column;

204: first through hole; 205: second through hole; 206: second radiating patch; 207: first feed member; 208: third through hole.

DESCRIPTION OF EMBODIMENTS

The following describes in detail embodiments of this application with reference to accompanying drawings.

For ease of understanding, an application scenario of an antenna apparatus in this application is first described. The antenna apparatus provided in embodiments of this application may be adapted to a mobile terminal, for example, used in a mobile phone, and is used as an antenna of the mobile terminal to transmit and receive a radio frequency signal.

In the conventional technology, when a millimeter-wave antenna radio frequency system is integrated into the mobile terminal, a slit is usually provided on a metal side frame of the mobile terminal, so that the metal side frame is used as a slot antenna to externally radiate. However, in such technical means, a reflection panel needs to be separately disposed to implement unidirectional transmission, and integration of an entire system is relatively low:

In view of this, embodiments of this application provide an antenna apparatus, to improve the integration of the antenna radio frequency system.

Figure 1:
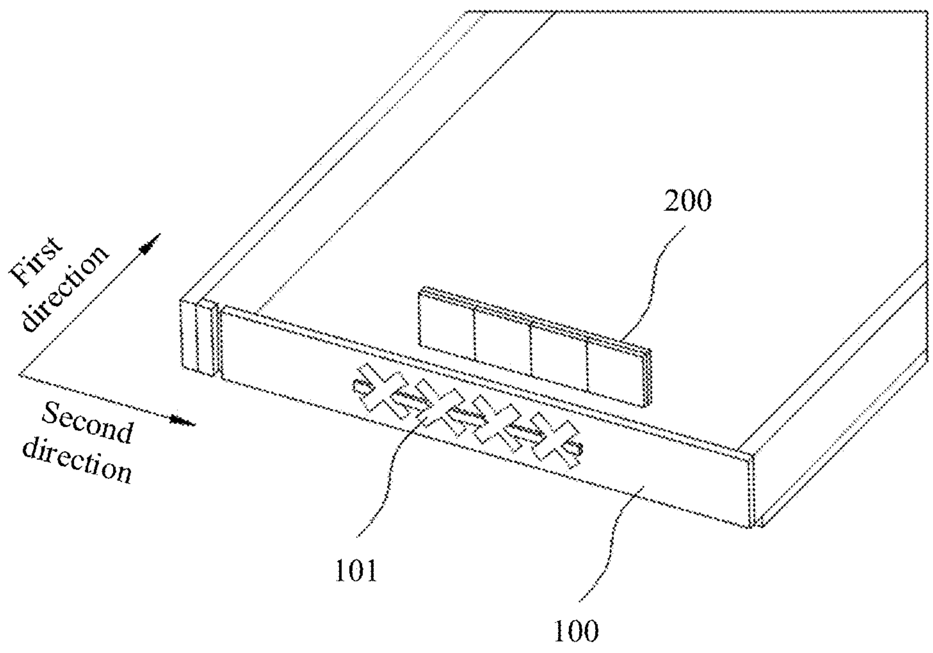
FIG. 1 is a diagram of a three-dimensional structure of an antenna apparatus according to an embodiment of this application.

First, refer to FIG. 1. FIG. 1 is a diagram of a three-dimensional structure of an antenna apparatus according to an embodiment of this application. As shown in FIG. 1, the antenna apparatus provided in embodiments of this application may include a first radiating patch 100 and a feed module 200. The first radiating patch 100 and the feed module 200 may be spaced from each other in a first direction, so that a slot antenna may be formed. The slot antenna may be used as a high-frequency antenna, and may be specifically used as a millimeter-wave antenna. Space between the first radiating patch 100 and the feed module 200 may be referred to as clearance, and the clearance may be filled with a dielectric material, or may be filled with nothing but air. A plurality of slot structures 101 arranged in a second direction may be provided on the first radiating patch 100. The first direction is perpendicular to an extension direction of the first radiating patch 100, and the second direction is the extension direction of the first radiating patch 100. Specifically, the extension direction of the first radiating patch 100 may be a length direction of the first radiating patch 100. In other words, the first direction is perpendicular to the length direction of the first radiating patch 100, and the second direction is the length direction of the first radiating patch 100.

Figure 2:
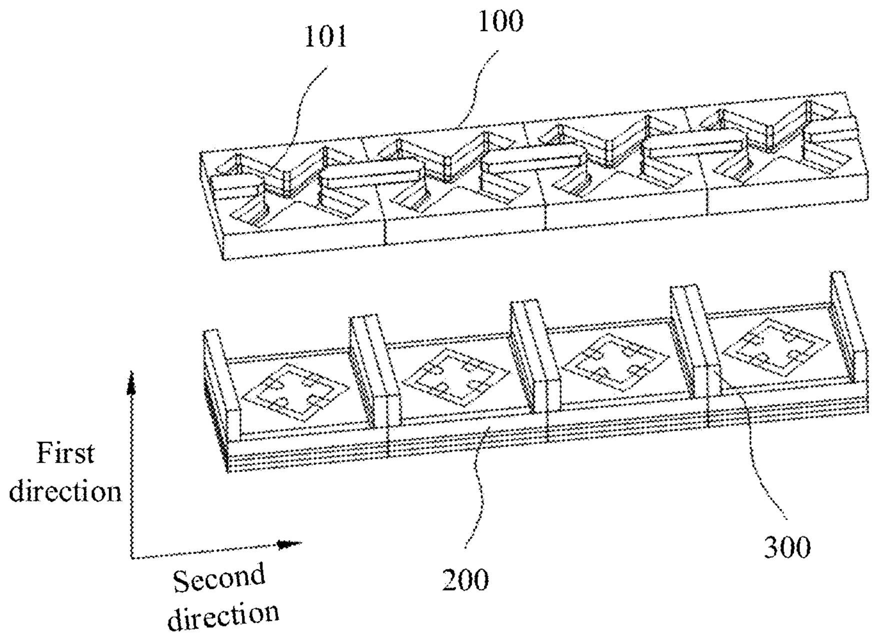
FIG. 2 is a diagram of a correspondence between a first radiating patch and a feed module of an antenna apparatus according to an embodiment of this application.

FIG. 2 is a diagram of a correspondence between a first radiating patch and a feed module of an antenna apparatus according to an embodiment of this application. As shown in FIG. 2, there may be a plurality of feed modules 200, and the plurality of feed modules 200 may be in one-to-one correspondence with the plurality of slot structures 101 in the second direction. One slot structure 101 corresponding to one feed module 200 and the first radiating patch around the slot structure 101 may be considered as a slot structure unit. Therefore, the plurality of feed modules 200 are in one-to-one correspondence with a plurality of slot structure units in the second direction.

During specific implementation, a support member 300 may be disposed between the first radiating patch 100 and the feed module 200. Specifically, the support member 300 may be disposed in the first direction. There may be a plurality of support members 300, and at least one support member 300 may be disposed between adjacent feed modules 200. In other words, at least one support member 300 may be disposed between adjacent slot structures 101. For example, two support members 300 may be disposed between two adjacent feed modules 200.

Figure 3:
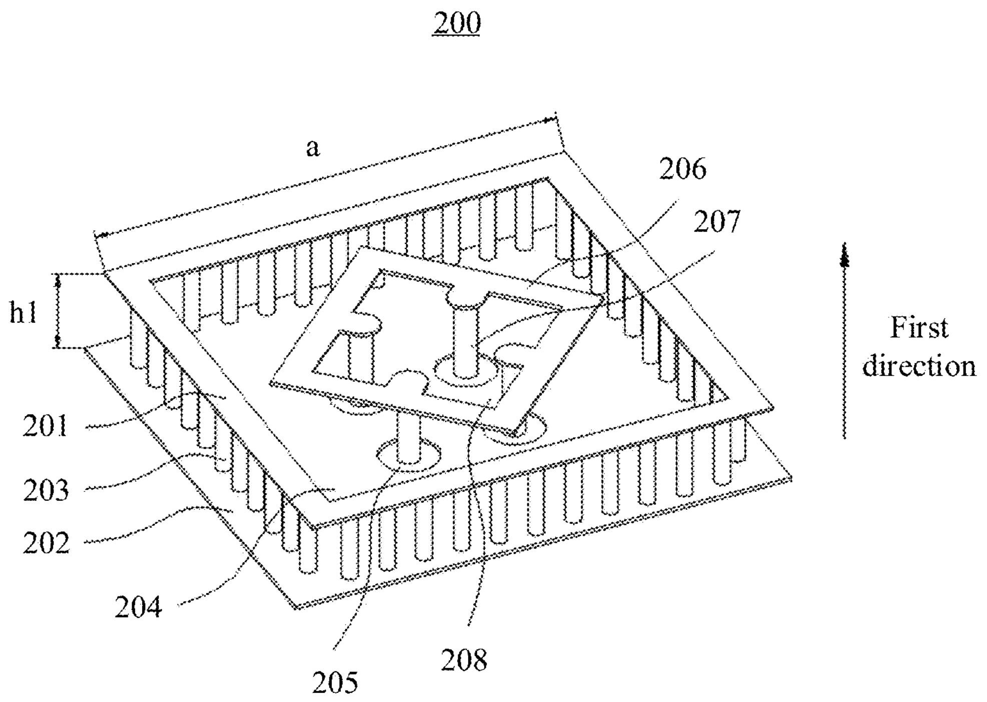
FIG. 3 is a diagram of a three-dimensional structure of a feed module of an antenna apparatus according to an embodiment of this application.
Figure 4:
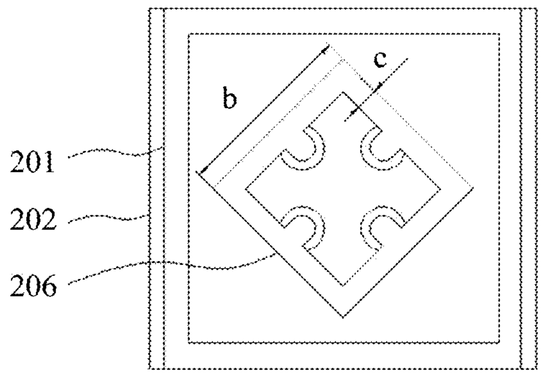
FIG. 4 is a schematic top view of a structure of a feed module of an antenna apparatus according to an embodiment of this application.

FIG. 3 is a diagram of a three-dimensional structure of a feed module of an antenna apparatus according to an embodiment of this application. FIG. 4 is a schematic top view of a structure of a feed module of an antenna apparatus according to an embodiment of this application. As shown in FIG. 3 and FIG. 4, the feed module 200 may include a ground component and a feed component. In a possible embodiment, the ground component may include a first conductor patch 201, a second conductor patch 202, and a conductor column 203. The first conductor patch 201 and the second conductor patch 202 may be spaced from each other in the first direction. The first conductor patch 201 may be located between the second conductor patch 202 and the first radiating patch 100. In other words, the first radiating patch 100, the first conductor patch 201, and the second conductor patch 202 are sequentially arranged in the first direction. Two ends of the conductor column 203 may be connected to the first conductor patch 201 and the second conductor patch 202 respectively. The conductor column 203 may implement a fixed connection between the first conductor patch 201 and the second conductor patch 202, and may also implement an electrical connection between the first conductor patch 201 and the second conductor patch 202. The first conductor patch 201 may have a first through hole 204, and the second conductor patch 202 may have a second through hole 205.

In a possible implementation, the ground component may be in a structure form of printed circuit board (PCB), and the first conductor patch and the second conductor patch may be fastened on a front surface and a back surface of a substrate of the PCB respectively. Both the first conductor patch and the second conductor patch may be square, and sizes of the first conductor patch and the second conductor patch may be the same. The first through hole may be square. Therefore, the first conductor patch may be a square frame structure. The conductor column may be disposed in a vial of the PCB. There may be a plurality of conductor columns, and the plurality of conductor columns may be arranged in a circumferential direction of the first conductor patch.

During specific implementation, two ends of the support member may be connected to the first radiating patch and the first conductor patch 201 respectively. A first end of the support member in the first direction may be fastened to a surface that is of the first conductor patch 201 and that faces the first radiating patch, and a surface that is of the first radiating patch and that faces the first conductor patch 201 may be fastened to a second end of the support member in the first direction, so that relative positions of the first radiating patch and the first conductor patch 201 are fixed. In other words, relative positions of the first radiating patch and the feed module 200 are fixed. When two support members are disposed between two adjacent feed modules 200, the two support members may be fastened on first conductor patches 201 of the two feed modules 200 respectively. During specific implementation, the support member may be made of an insulation material. The support member may be fastened to the first radiating patch and the first conductor patch 201 through bonding. For reference, a height of the support member in the first direction may be 0.1λ, to 0.2λ. In other words, a height of the clearance in the first direction may be 0.1λ to 0.2λ. λ is a wavelength of an operating frequency band of the millimeter-wave antenna in free space, and λ is approximately 11.1 mm.

In a possible embodiment, the feed component may include a second radiating patch 206 and a first feed member 207, and the second radiating patch 206 and the second conductor patch 202 may be spaced from each other in the first direction. A projection of the second radiating patch 206 on the first conductor patch 201 may be located in the first through hole 204. During specific implementation, when the ground component is in the structure form of PCB, the second radiating patch 206 may be fastened to the front surface of the PCB, and a first end of the first feed member 207 may pass through the second through hole 205 and the via of the PCB to be electrically connected to the second radiating patch 206. A second end of the first feed member 207 may be electrically connected to a millimeter-wave transceiver radio frequency chip of a millimeter-wave antenna radio frequency system.

During specific implementation, the second radiating patch 206 may have a third through hole 208. During specific implementation, the third through hole 208 may be square. Therefore, the second radiating patch 206 may be a square frame structure. In this way, the second radiating patch 206 can effectively excite the slot structure to generate a resonance. During actual disposition, the second radiating patch 206 and the first conductor patch 201 may be located in a same plane in the first direction. In other words, the second radiating patch 206 and the first conductor patch 201 may be located at a same height in the first direction. In this case, the second radiating patch 206 is located in the first through hole 204.

During specific implementation, there may be a plurality of first feed members 207, and the plurality of first feed members 207 may be arranged in a circumferential direction of the second radiating patch 206. For example, there may be four first feed members 207, which may form two pairs of differential feeding. In this way, the feed module 200 can perform feeding in a differential manner, and the millimeter-wave antenna can provide two resonances. Corresponding to the first feed members 207, there are a plurality of second through holes 205, and the plurality of second through holes 205 are in one-to-one correspondence with the plurality of first feed members 207. In other words, the first feed members 207 are in one-to-one correspondence with the second through holes 205.

Figure 5:
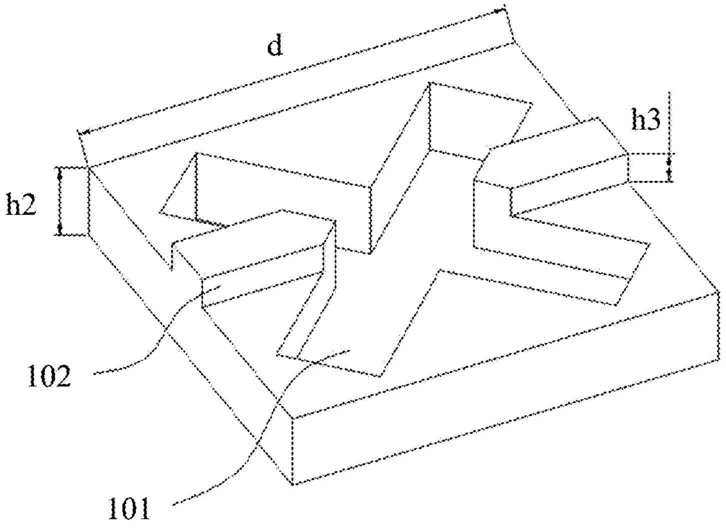
FIG. 5 is a three-dimensional diagram of a partial three-dimensional structure of a first radiating patch of an antenna apparatus according to an embodiment of this application.

FIG. 5 is a three-dimensional diagram of a partial three-dimensional structure of a first radiating patch of an antenna apparatus according to an embodiment of this application. As shown in FIG. 5, during specific implementation, the slot structure 101 on the first radiating patch may be in a cross shape. An area of the slot structure 101 may be less than an area of the second conductor patch. For example, when the slot structure 101 is in the cross shape, an area of the cross may be less than the area of the second conductor patch. During specific implementation, a protrusion structure 102 may be provided on the first radiating patch. The protrusion structure 102 has a function of adjusting matching of the millimeter-wave antenna. Protrusion structures 102 of different heights are disposed, so that the millimeter-wave antenna can have different matching. Specifically, the protrusion structure 102 may be provided on a surface that is of the first radiating patch and that backs on the feed module.

Figure 6:
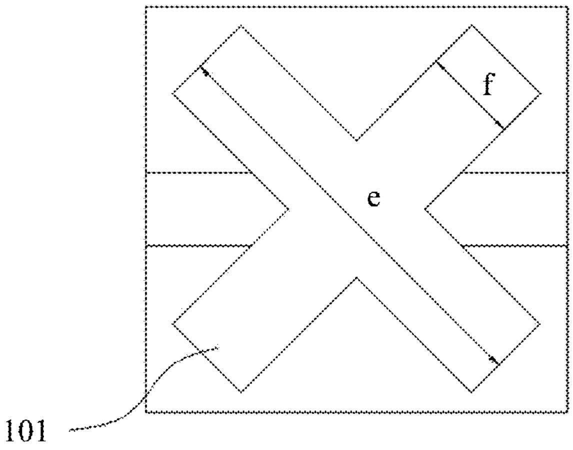
FIG. 6 is a schematic top view of a partial structure of a first radiating patch of an antenna apparatus according to an embodiment of this application.

FIG. 6 is a schematic top view of a partial structure of a first radiating patch of an antenna apparatus according to an embodiment of this application. With reference to FIG. 3 to FIG. 6, for reference, a height h1 of the feed module 200 in the first direction is 0.1λ, a side length a of the square first conductor patch 201 is 0.57λ, a side length b of the square frame-shaped second radiating patch 206 is 0.2λ to 0.35λ, a width c of the side length of the second radiating patch 206 is 0.02λ to 0.04λ, a height h2 of the first radiating patch in the first direction is 0.11λ, a height h3 of the protrusion structure 102 in the first direction is 0 to 0.06λ, a length d of the slot structure unit in the second direction is 0.6λ, a side length e of a single side of the cross-shaped slot structure 101 is 0.45λ to 0.7λ, and a width f of the single side of the slot structure 101 is 0.1λ to 0.2λ.

According to the antenna apparatus provided in embodiments of this application, the slot structure 101 is provided on the first radiating patch 100, and the first radiating patch 100 and the feed module 200 that are spaced from each other form the slot antenna. The slot antenna may be used as the millimeter-wave antenna, and the feed module 200 is coupled to and feeds the slot structure 101 through clearance. The ground component is used as a ground of the slot antenna, and the ground component can have a reflection function, to implement unidirectional transmission of a radio frequency signal. Compared with the conventional technology, the ground component is integrated into the feed module 200. Therefore, there is no need to separately dispose an additional reflection panel. This can improve integration of the antenna radio frequency system and facilitate miniaturization of an antenna product.

In addition, the first feed member 207 may directly pass through the second conductor patch 202 through the second through hole 205 to connect to the second radiating patch 206, so that a length of the first feed member 207 can be relatively short. This can further improve the system integration. During specific implementation, the first feed member 207 may be of a metal column structure.

During actual application, the antenna apparatus provided in embodiments of this application may provide two resonances. The slot structure 101 may provide one resonance under excitation of the feed module 200. Specifically, the second radiating patch 206 of the feed module 200 excites the slot structure 101 to generate the resonance. The second radiating patch 206 of the feed module 200 directly provides the other resonance. The antenna apparatus provided in embodiments of this application may be applied to a 5G millimeter-wave system, an IEEE 802.11.ad (60 GHz WiGig) system, an IEEE 802.11.aj (45 GHZ Q-Link-Pan) system, and another high-frequency wireless communication system.

Figure 7:
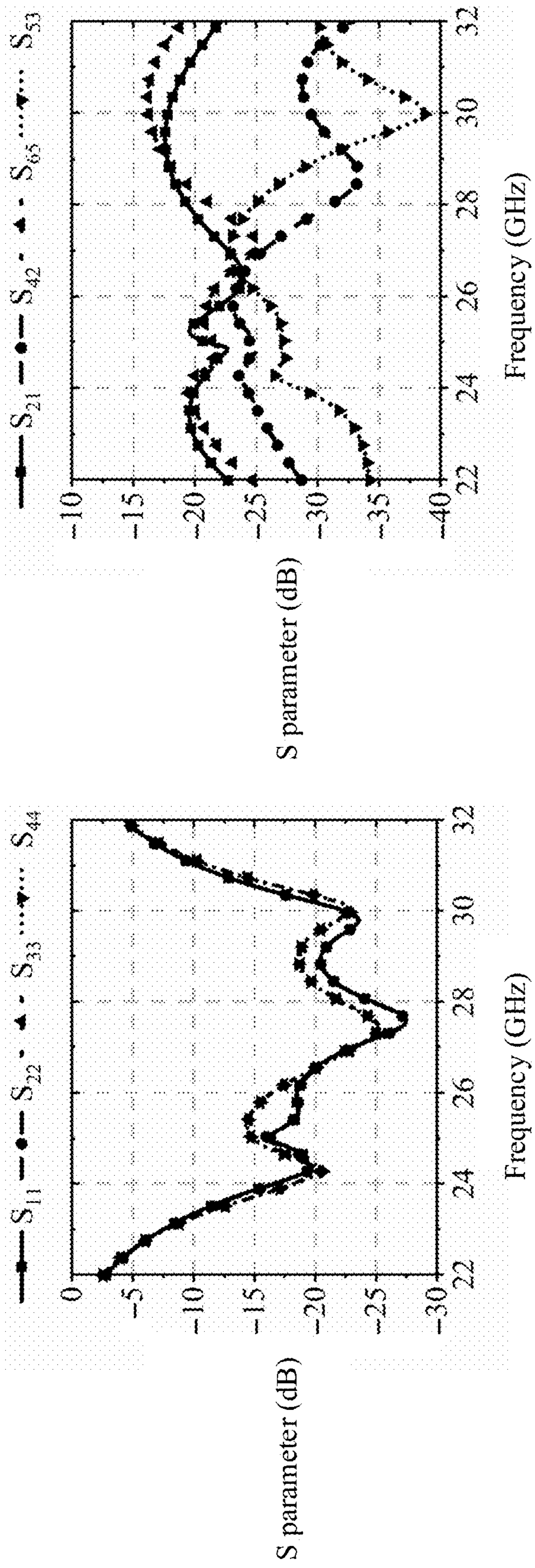
FIG. 7 is a diagram of an S parameter of an antenna apparatus used as a millimeter-wave antenna according to an embodiment of this application.
Figure 8:
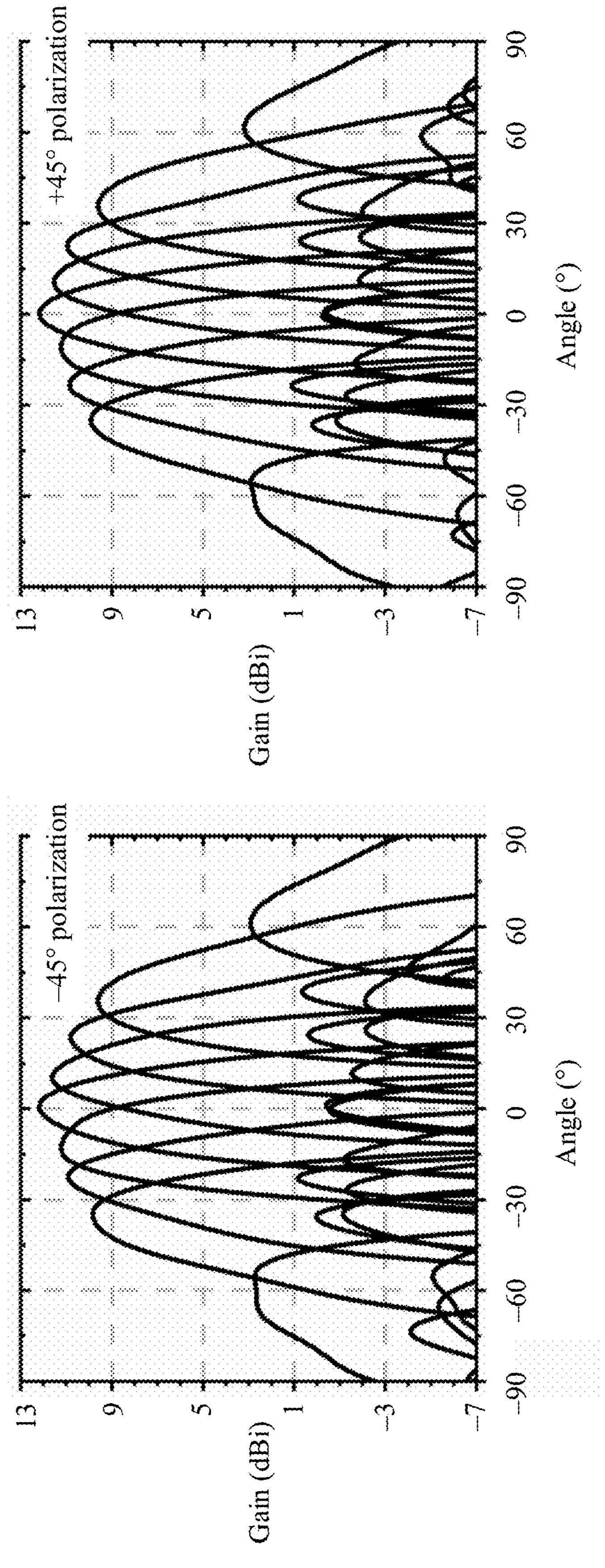
FIG. 8 is a half-plane scan pattern of an antenna apparatus used as a millimeter-wave antenna according to an embodiment of this application.

FIG. 7 is a diagram of an S parameter of an antenna apparatus used as a millimeter-wave antenna according to an embodiment of this application. A left diagram in FIG. 7 specifically shows a return loss of the millimeter-wave antenna, and a right diagram in FIG. 7 specifically shows isolation of the millimeter-wave antenna. It can be learned from FIG. 7 that the return loss and the isolation of the millimeter-wave antenna are relatively desirable. FIG. 8 is a half-plane scan pattern of an antenna apparatus used as a millimeter-wave antenna according to an embodiment of this application. A left diagram and a right diagram in FIG. 8 respectively show two different polarizations. It can be learned from FIG. 8 that a pattern of the millimeter-wave antenna is relatively desirable.

Figure 9:
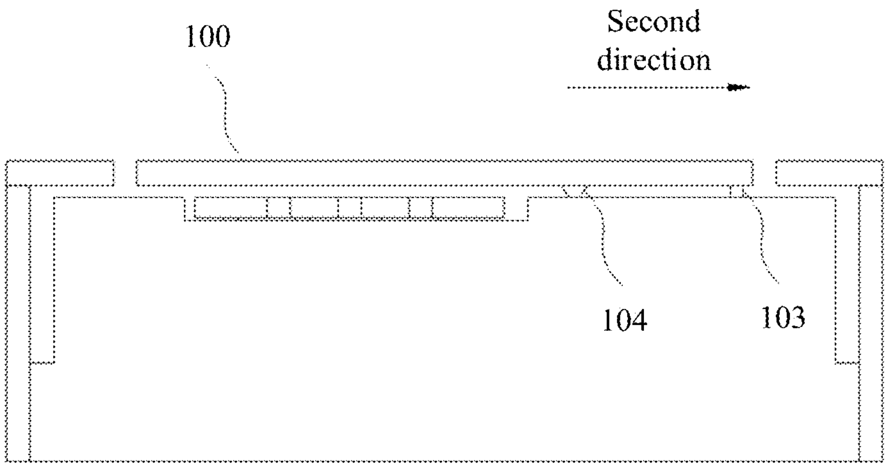
FIG. 9 is a schematic top view of structure of an antenna apparatus according to an embodiment of this application.

FIG. 9 is a schematic top view of structure of an antenna apparatus according to an embodiment of this application. As shown in FIG. 9, in a possible embodiment, a first end of the first radiating patch 100 in the second direction may be electrically connected to a ground member 103. In addition, the first end of the first radiating patch 100 in the second direction may be further electrically connected to a second feed member 104. Both the ground member 103 and the second feed member 104 may be disposed close to the first end of the first radiating patch 100 in the second direction, to avoid the feed module. The first end of the first radiating patch 100 in the second direction may be a right end of the first radiating patch 100 shown in FIG. 9. Certainly, the first end of the first radiating patch 100 in the second direction may alternatively be a left end of the first radiating patch 100 shown in FIG. 9. Specifically, one end of the second feed member 104 may be electrically connected to the first radiating patch 100, and the other end of the second feed member 104 may be electrically connected to a low-frequency transceiver radio frequency chip of a low-frequency antenna radio frequency system. The ground member 103 and the second feed member 104 are spaced from each other. Therefore, the first radiating patch 100, the ground member 103, and the second feed member 104 may form an inverted F-shaped antenna (IFA). The first radiating patch 100 may have a low-frequency radiation function. In this way: the antenna apparatus provided in embodiments of this application can have both a millimeter-wave radiation function and a low-frequency radiation function. It may be understood that, in addition to being used as a radiator of the inverted F-shaped antenna, the first radiating patch 100 may be used as a radiator of a low-frequency antenna in another form. This is not limited in this application.

Figure 10:
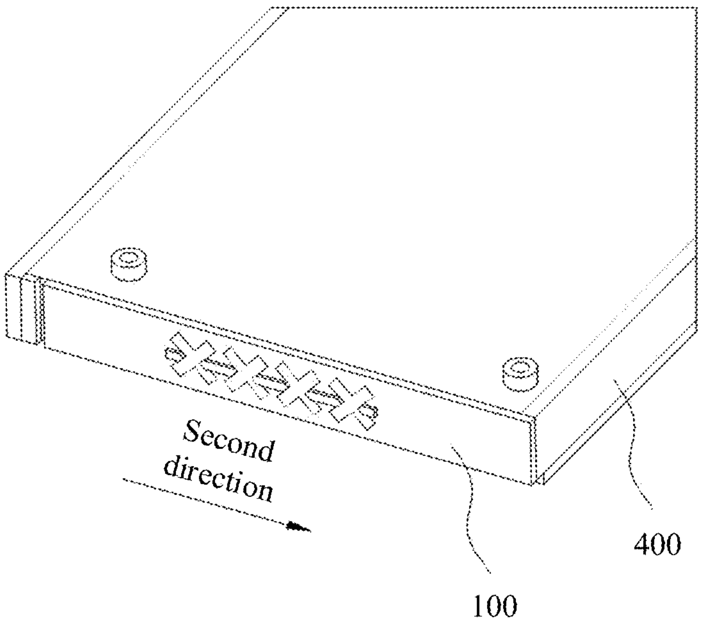
FIG. 10 is a diagram of a structure of a mobile terminal according to an embodiment of this application.

FIG. 10 is a diagram of a structure of a mobile terminal according to an embodiment of this application. As shown in FIG. 10, the antenna apparatus provided in embodiments of this application may be adapted to the mobile terminal and used as an antenna of the mobile terminal. In a possible embodiment, the mobile terminal may include a housing 400 and the antenna apparatus in the foregoing embodiment. During specific implementation, the housing 400 may have an opening. Specifically, the opening may be located at one end of the housing 400 in a length direction, or may be located at another position on the housing 400. A first radiating patch 100 may be disposed in the opening. There may be a gap between the first radiating patch 100 and the housing 400. The gap may be filled with a dielectric material to seal the housing. The first radiating patch 100 and the housing 400 are relatively fastened and may be insulated from each other. A feed module may be disposed in the housing 400.

In another possible embodiment, a first end of the first radiating patch 100 in a second direction may be electrically connected to the housing 400 or a reference ground in the housing 400, so that the first radiating patch 100 is grounded. During specific implementation, the first end of the first radiating patch 100 in the second direction may be electrically connected to the housing 400 through the ground member, and an electrical connection point between the ground member and the first end of the first radiating patch 100 in the second direction is a ground point of the first radiating patch 100. Alternatively, the first end of the first radiating patch 100 in the second direction is directly electrically connected to the housing 400, and an electrical connection point between the first radiating patch 100 and the housing 400 is a ground point of the first radiating patch 100. The first end of the first radiating patch 100 in the second direction may further be electrically connected to the second feed member. An electrical connection point between the second feed member and the first radiating patch 100 is a feed point of the first radiating patch 100. The feed point and the ground point of the first radiating patch 100 are spaced from each other.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. An antenna apparatus, comprising a first radiating patch and a plurality of feed modules, wherein the first radiating patch and the plurality of feed modules are spaced from each other in a first direction, and the first direction is perpendicular to an extension direction of the first radiating patch;
a plurality of slot structures arranged in a second direction are provided on the first radiating patch, and the second direction is the extension direction of the first radiating patch;
the plurality of feed modules are in one-to-one correspondence with the plurality of slot structures, and are disposed in the second direction;
and each of the plurality of feed modules comprises a ground component and a feed component; the ground component comprises a first conductor patch, a second conductor patch, and a conductor column, the first conductor patch and the second conductor patch are spaced from each other in the first direction, the first conductor patch is located between the second conductor patch and the first radiating patch, two ends of the conductor column are connected to the first conductor patch and the second conductor patch respectively, the first conductor patch has a first through hole, and the second conductor patch has a second through hole; and the feed component comprises a second radiating patch and a first feed member, a projection of the second radiating patch on the first conductor patch is located in the first through hole, and the first feed member passes through the second through hole and is connected to the second radiating patch.

2. The antenna apparatus according to claim 1, wherein a first end of the first radiating patch in the second direction is connected to a ground member and a second feed member separately, and the ground member and the second feed member are spaced from each other.

3. The antenna apparatus according to claim 1, wherein at least one slot structure of the plurality of slot structures is in a cross shape.

4. The antenna apparatus according to claim 1, wherein a protrusion structure is provided on the first radiating patch.

5. The antenna apparatus according to claim 1, wherein there are a plurality of conductor columns, and the plurality of conductor columns are arranged in a circumferential direction of the first conductor patch.

6. The antenna apparatus according to claim 1, wherein the second radiating patch has a third through hole.

7. The antenna apparatus according to claim 1, wherein a plurality of first feed members are provided and arranged in a circumferential direction of the second radiating patch; and
a plurality of second through holes are provided and are in one-to-one correspondence with the plurality of first feed members.

8. The antenna apparatus according to claim 1, wherein the second radiating patch and the first conductor patch are located in a same plane in the first direction.

9. The antenna apparatus according to claim 1, wherein a support member is disposed between the first radiating patch and a corresponding feed module, and two ends of the support member are connected to the first radiating patch and the first conductor patch respectively.

10. The antenna apparatus according to claim 2, wherein a plurality of first feed members are provided and arranged in a circumferential direction of the second radiating patch; and
a plurality of second through holes are provided and are in one-to-one correspondence with the plurality of first feed members.

11. The antenna apparatus according to claim 3, wherein a plurality of first feed members are provided and arranged in a circumferential direction of the second radiating patch; and
a plurality of second through holes are provided and are in one-to-one correspondence with the plurality of first feed members.

12. The antenna apparatus according to claim 4, wherein a plurality of first feed members are provided and arranged in a circumferential direction of the second radiating patch; and
a plurality of second through holes are provided and are in one-to-one correspondence with the plurality of first feed members.

13. A mobile terminal, comprising a housing and an antenna apparatus,
wherein the antenna apparatus comprises a first radiating patch and a plurality of feed modules, wherein the first radiating patch and the plurality of feed modules are spaced from each other in a first direction, and the first direction is perpendicular to an extension direction of the first radiating patch;
a plurality of slot structures arranged in a second direction are provided on the first radiating patch, and the second direction is the extension direction of the first radiating patch;
the plurality of feed modules are in one-to-one correspondence with the plurality of slot structures, and are disposed in the second direction; and
each of the plurality of feed modules comprises a ground component and a feed component; the ground component comprises a first conductor patch, a second conductor patch, and a conductor column, the first conductor patch and the second conductor patch are spaced from each other in the first direction, the first conductor patch is located between the second conductor patch and the first radiating patch, two ends of the conductor column are connected to the first conductor patch and the second conductor patch respectively, the first conductor patch has a first through hole, and the second conductor patch has a second through hole; and the feed component comprises a second radiating patch and a first feed member, a projection of the second radiating patch on the first conductor patch is located in the first through hole, and the first feed member passes through the second through hole and is connected to the second radiating patch;
wherein the housing has an opening, the first radiating patch is disposed in the opening, there is a gap between the first radiating patch and the housing, and the plurality of feed modules are disposed in the housing.

14. The mobile terminal according to claim 13, wherein a first end of the first radiating patch in the second direction is connected to the housing.

15. The mobile terminal according to claim 13, wherein a first end of the first radiating patch in the second direction is connected to a ground member and a second feed member separately, and the ground member and the second feed member are spaced from each other.

16. The antenna apparatus according to claim 2, wherein a protrusion structure is provided on the first radiating patch.

17. The antenna apparatus according to claim 3, wherein a protrusion structure is provided on the first radiating patch.

18. The antenna apparatus according to claim 2, wherein a plurality of conductor columns are provided and arranged in a circumferential direction of the first conductor patch.

19. The antenna apparatus according to claim 3, wherein a plurality of conductor columns are provided and arranged in a circumferential direction of the first conductor patch.

20. The antenna apparatus according to claim 4, wherein a plurality of conductor columns are provided and arranged in a circumferential direction of the first conductor patch.

* * * * *